United States Patent [19]
Hoffelner

[11] Patent Number: 5,688,105
[45] Date of Patent: Nov. 18, 1997

[54] BRUSH SEAL FOR TURBO-ENGINES

[75] Inventor: Herbert Hoffelner, Markt-Indersdorf, Germany

[73] Assignee: MTU Motoren- und Turbinen-Union Muenchen GmbH, Munich, Germany

[21] Appl. No.: 693,007

[22] Filed: Aug. 6, 1996

[30] Foreign Application Priority Data

Aug. 11, 1995 [DE] Germany .......... 195 26 655.9

[51] Int. Cl.$^6$ .................................. F04D 29/08
[52] U.S. Cl. .............. 415/170.1; 415/229; 277/53
[58] Field of Search .............. 415/170.1, 174.3, 415/229, 230; 277/53

[56] References Cited

U.S. PATENT DOCUMENTS

| | | | |
|---|---|---|---|
| 5,031,922 | 7/1991 | Heydrich | 277/53 |
| 5,066,024 | 11/1991 | Reisinger et al. | |
| 5,174,582 | 12/1992 | Ferguson | 277/53 |
| 5,318,309 | 6/1994 | Tseng et al. | |
| 5,351,971 | 10/1994 | Short | 277/53 |
| 5,400,952 | 3/1995 | Hetico et al. | 415/174.2 |
| 5,480,165 | 1/1996 | Flower | 277/53 |

FOREIGN PATENT DOCUMENTS

3907614A1  9/1990  Germany .

*Primary Examiner*—John T. Kwon
*Attorney, Agent, or Firm*—Evenson McKeown Edwards & Lenahan PLLC

[57] ABSTRACT

A brush seal assembly is provided for sealing off spaces on a circumferential gap which are acted upon by pressure in a different manner, particularly between an engine casing and an engine shaft. On the engine casing, a holding device for a bristle bundle is provided from which the bristle bundle is guided between circumferential webs sealingly against the engine rotor and, with respect to the one web facing the high pressure side, forms an axial gap in the circumferential direction. In the axial gap, a covering ring for the bristle bundle is arranged in an axially and radially movable manner which is operated by the differential pressure and can be displaced with respect to the bristle bundle. With respect to the ends of the webs surrounding the engine shaft at a distance, the covering ring is to project out of the axial gap and surround the engine shaft by means of a radial sealing gap.

20 Claims, 3 Drawing Sheets

BRUSH SEAL FOR TURBO-ENGINES

BACKGROUND AND SUMMARY OF THE INVENTION

This invention relates to a brush seal for turbo-engines of the type having an engine rotor and stator with a bristle bundle sealing space between the rotor and stator intermediate an upstream high pressure space and a downstream lower pressure space.

Brush seals of the above-mentioned type (German Patent Document DE 39 07 614 A1) are used in turbo-engines, particularly gas turbine engines, in order to seal off spaces on circumferential gaps which are acted upon fluidically by pressure in different manners, for example, between an engine casing and an engine shaft, with respect to one another with as little leakage flux as possible.

It should be possible in a system of this type to compensate eccentric shaft positions relative to the casing resulting, for example, from unbalanced rotor masses by means of an elastic and movable following of bristles. Comparatively pronounced shaft eccentricities are generally linked to a high leakage flux on the seal.

It is a significant disadvantage of the above-mentioned as well as of other known brush seals that, as a result of the shaft rotation, the bristles of the brush are subjected to a rotating turbulent flow originating from the space with the higher pressure which has a negative effect on the shape and the intended geometrical arrangement of the brush and therefore on the sealing effect. The turbulent flow has a particularly negative effect on the local position of those free ends of the bristles which project with respect to the ends of guide webs in the direction of the rotor surface or shaft surface. A reliable, low-leakage primary sealing is therefore not ensured. In addition, the formation of individual and particularly pronounced types and geometries of turbulences may, in addition, be promoted by special shaft-side surface geometries and attachments such as screws, beads, or steps.

It is an object of the invention to provide a brush seal of the initially mentioned type which, despite a rotating turbulent flow caused by the shaft or on the shaft—in the space of the higher pressure, in front of the seal—ensures the maintaining of the shape and geometry of the bristles for the purpose of an optimal sealing.

This object is achieved according to preferred embodiments of the invention by a brush seal for turbo-engines for sealing off spaces on a circumferential gap which are acted upon by pressure in a different manner, particularly between an engine casing and an engine shaft, a holding device for a bristle bundle being provided on the engine casing, from which holding device the bristle bundle is guided between circumferential webs in a sealing manner against the engine rotor and forms an axial gap in the circumferential direction with respect to the one web facing the high pressure side, wherein a covering ring for the bristle bundle is arranged in the axial gap in an axially and radially movable manner, which covering ring is operated by the differential pressure and can be displaced with respect to the bristle bundle, and wherein the covering ring projects out of the axial gap with respect to the ends of the webs surrounding the engine shaft at a distance and surrounds the engine shaft by means of a radial sealing gap.

The covering ring protects the bristle bundle effectively from a turbulent flow formed in the space of the higher pressure. A particularly pronounced turbulent flow may be caused, for example, by a screwed connection which rotates along with the shaft and is arranged upstream in the space of the higher pressure and which is characterized by screw heads which project axially in a circumferential interruption. By means of the portion which radially projects with respect to the local web ends, the covering ring protects the portion of the bristle bundle which is particularly endangered with respect to the turbulence formation of the fluid, for example, compressed air, and which is mainly responsible for the primary sealing on the shaft.

In addition, by means of the portion of the covering ring which projects radially from the axial gap with respect to the web ends, the primary sealing effect is increased.

By means of the existing differential pressure (P1>P2), the covering ring is pressed axially against the one section of the bristle bundle facing the high-pressure side and, as a result, the bristle bundle is pressed against the circumferential interior surface of the web which faces the low-pressure side, in a sealing support. In this case, the covering ring forms a spacing gap X in the axial gap with respect to the interior flank of the web arranged upstream, which spacing gap X defines not only a maximally permissible axial migrating movement of the covering ring but also forms a secondary leakage flux passage and a pressure distribution, which is uniform along the circumference, for the contact pressure onto the bristle bundle.

The radial displaceability of the covering ring depends on the axial contact pressure force onto the bristle bundle caused by the applied differential pressure. In order to keep the axial contact pressure force of the covering ring within defined limits, fluidic compensating and relieving measures can be provided on the covering ring according to certain preferred embodiments, such as perforations and/or passage holes or bores. The perforations may consist of needle-thick, very fine bores. Furthermore, the covering may be a screen-hole-type design according to other contemplated preferred embodiments.

According to the invention, the term "perforation" may also mean that the covering ring has an axially flow-permeable porous design.

According to certain preferred embodiments, the above-mentioned fluidic relieving measures (perforation, holes, bores) are to be carried out such that the end portion of the bristle bundle which projects radially beyond the web ends in the direction of the shaft is protected to a very large extent from the turbulent-type fluid by a circumferential section of the covering ring which is closed in itself and, in this manner, an increased primary sealing effect by means of the covering ring is also achieved.

For accommodating pronounced shaft eccentricities, preferred embodiments of the invention also permit a comparatively low primary leakage on the seal by way of the covering ring which, in the case of shaft eccentricity, is radially displaced on one side by the engine shaft in relation to the locally clearly much more pronounced radial displacement of the engine shaft with respect to the bristles.

Other objects, advantages and novel features of the present invention will become apparent from the following detailed description of the invention when considered in conjunction with the accompanying drawings.

DETAILED DESCRIPTION OF THE DRAWINGS

Figure 1:
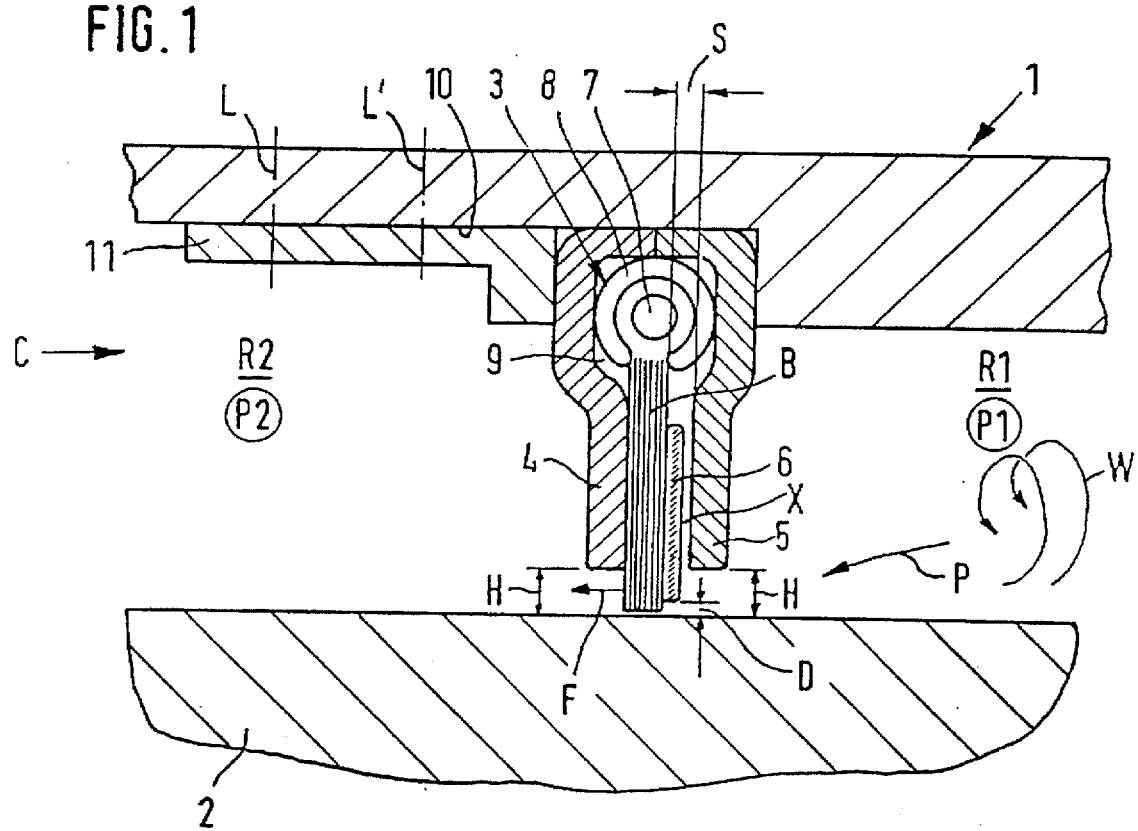
FIG. 1 is an axial sectional view of a brush seal assembly constructed according to a preferred embodiment of the invention, assigned to sections of an engine casing and engine shaft, the case-side holding device of the brush seal and its function being illustrated with a covering ring operated by the differential pressure.

FIG. 1 illustrates a brush seal assembly for a turbo-engine. Between an engine casing 1 and the surface of an engine shaft 2 rotatably disposed in a coaxial manner in the casing, the brush seal is to seal off a circumferential gap with respect to spaces R1, R2 which are fluidically acted upon differently by pressure. In this case, the existing fluid pressure P1 in space R1 is higher than the fluid pressure P2 in space R2. The primary leakage flux on the seal is indicated by the arrow F. A holding device 3 for a bristle bundle B is provided on the engine stator 1. From the holding device 3, the bristle bundle B is guided between essentially parallel webs 4, 5 extending perpendicular relative to the rotor surface in a sealing manner toward the rotor surface. On the side facing the space R2 with the lower pressure P2, the bristle bundle B touches the corresponding one interior surface of the web 4. On the other side facing the space R1 with the higher pressure P1, the bristle bundle B forms an axial gap S in the circumferential direction with respect to the interior surface of the web 5.

Figure 2:
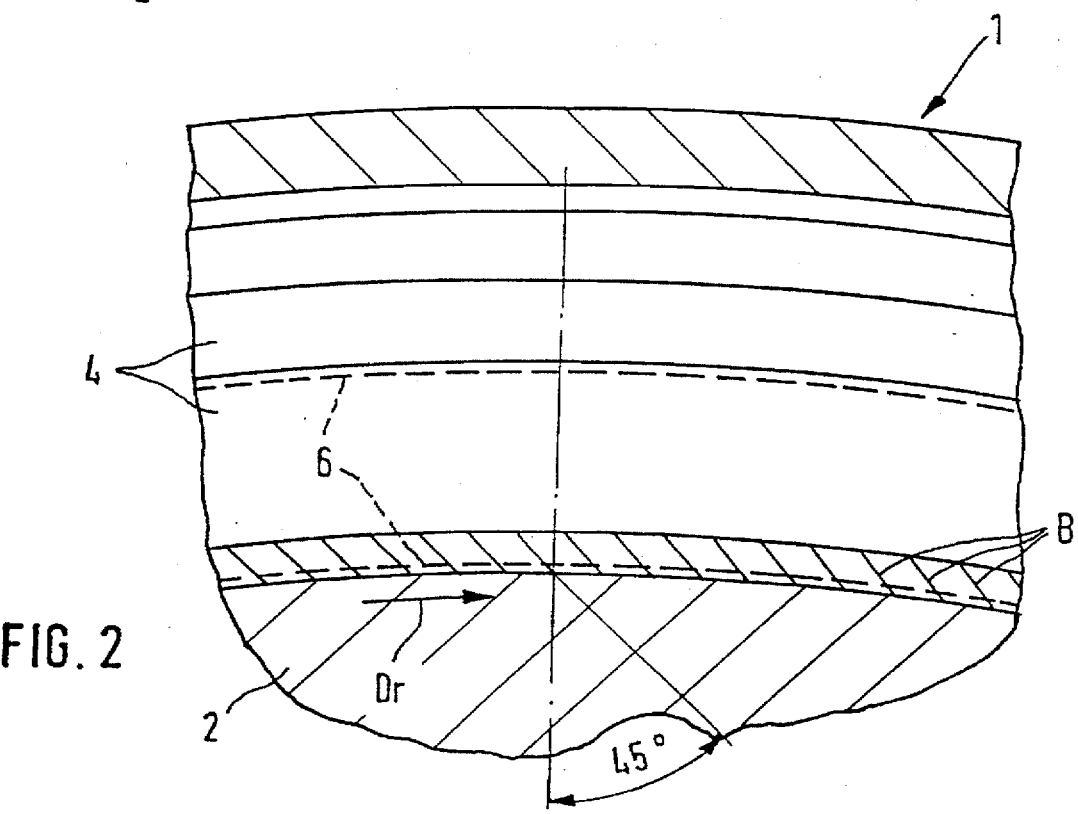
FIG. 2 is a view taken in viewing direction C of FIG. 1.

FIG. 2 shows the bristles of the bundle B, which are indicated only schematically at relatively large circumferential distances, in which case the bristles are set along the circumference in the sense of the rotating direction Dr of the engine shaft 2 in each case in a uniform manner diagonally at an angle of 45° and can contact the shaft surface—or as illustrated in FIG. 1—can be arranged while leaving a minimal radial sealing gap with respect to the shaft surface.

By way of the holding device 3, the bristle bundle B is fixedly connected with the engine casing 1. On a section which is bent essentially in a U-shape around a core ring 7, the bristle bundle B is clamped by a clamping tube 8. The latter has a circumferential slot for the bristle bundle B. Radially in the interior, the clamping tube 8 is fixedly disposed in an annulus 9 which is open on one side and which is formed by two casing parts which contain the circumferential webs 4, 5. Both casing parts with the webs 4, 5 are clamped and held in a circumferential groove. This circumferential groove is formed by a step-type widening 10 of the engine casing 1 to a larger inside diameter as well as by the axial end surface of a ring component 11. The ring component 11 is screwed together with the engine casing 1 along lines L, L'.

All bristles of the bristle bundle B may be made of a ceramic material, particularly silicon carbide. As an alternative, highly alloyed metallic bristle materials can be used.

According to FIGS. 1 and 2, a covering ring 6 for the bristle bundle B is arranged in the axial gap S in an axially and radially movable manner. The covering ring 6 is operated by the existing differential pressure P1>P2 so that, in the case of a sufficient pressure difference, it is displaced axially to the left against the bristle bundle B. As a result, the bristle bundle B itself, along the low-pressure-side circumferential end surface, is pressed against the interior surface of the web 4 facing the low pressure side. With respect to the ends of the webs 4, 5 surrounding the engine shaft 2 at, in each case, equally large circumferential distances H (centered position of covering ring 6 with respect to shaft 2 and casing 1), the covering ring 6 projects out of the axial gap S. The covering ring 6 surrounds the shaft 2 while leaving a radial sealing gap D. The above-mentioned web distance H with respect to the surface of the engine shaft 2 is selected to be so large that, also in the case of a relatively pronounced shaft eccentricity Δr (FIG. 3b), the engine shaft cannot brush against the corresponding ends of the webs 4, 5. In the described arrangement and operated by the differential pressure P1>P2, the covering ring 6 forms an axial ring gap X with respect to the interior surface of the web 5 which is on the right in FIG. 1. While providing a corresponding width of the axial gap S relative to the thickness of the covering ring 6, the provided axial ring gap X therefore defines the maximal axial freedom of movement of the covering ring in the axial gap S.

The ring gap X represents a secondary leakage flux passage for a relatively small proportion of the fluid fed from space R1 of the higher pressure P1, which fluid flows off above the covering ring 6 along a portion of the axial gap S and from there, seeping through the bristle bundle B, into the space R2 of the lower pressure P2.

The letter W schematically indicates a rotating turbulent flow existing in the space R1 from the which seal according to the arrow P is fed with a fluid, such as compressed air. The arrangement of the covering ring 6 protects the bristle bundle B from the turbulently flowing in compressed air. Particularly the end portion of the bristle bundle B which is responsible for the primary shaft sealing and which projects beyond the ends of both webs 4, 5 in the direction of the engine shaft 2, is therefore not negatively affected with respect to its intended arrangement and geometry.

Figure 3A:
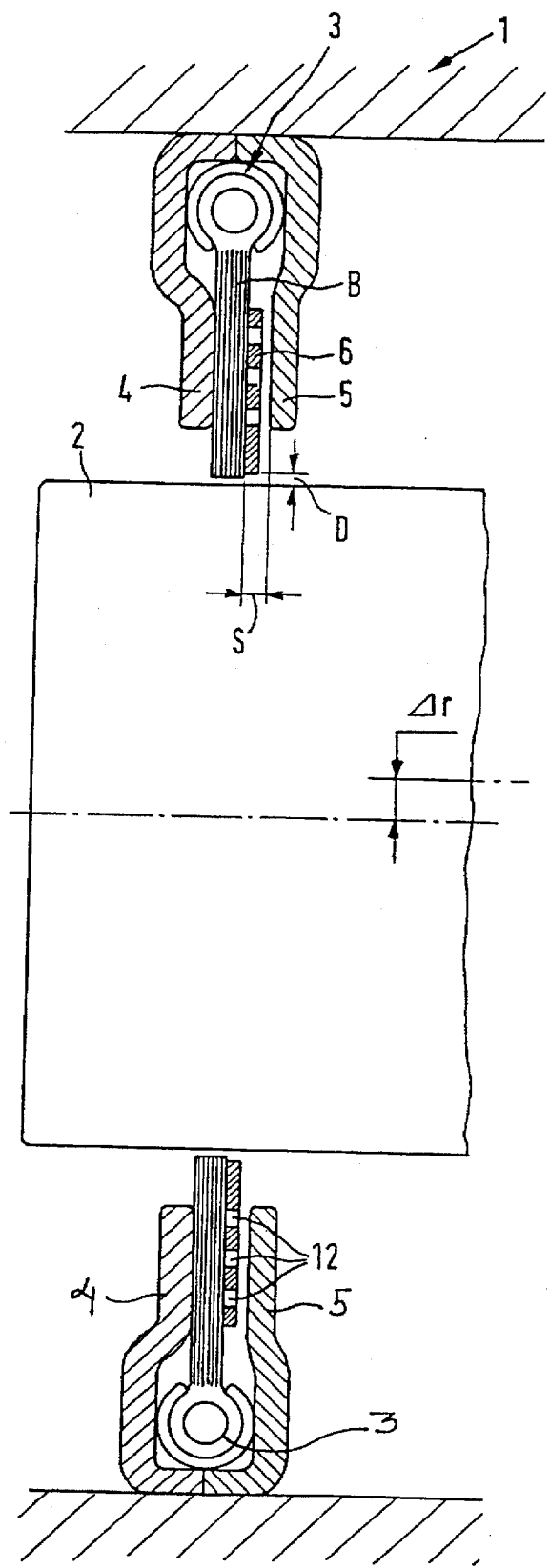
FIG. 3a is an axial sectional view of a brush seal assembly constructed according to another preferred embodiment of the invention, including an axially perforated covering ring, shown in a steady-state operating condition without any shaft eccentricity.
Figure 3B:
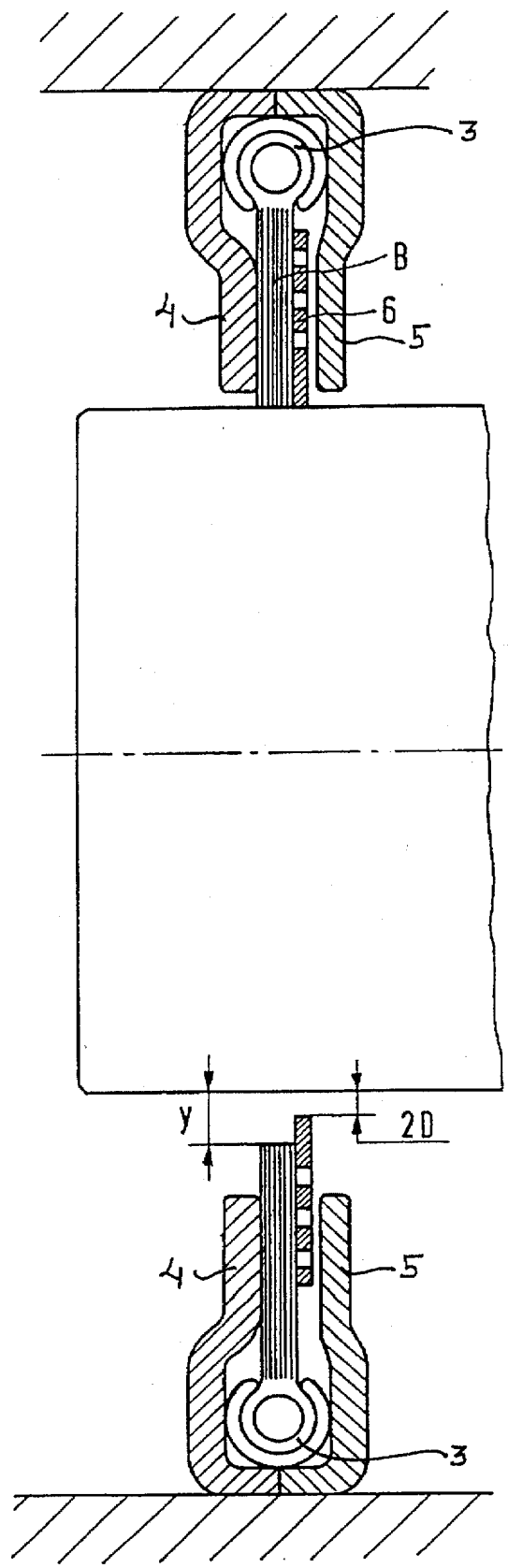
FIG. 3b is a view of the brush seal assembly of FIG. 3a showing the parts with a shaft eccentricity (Δr) which is clearly pronounced in comparison to FIG. 3a and the mainly resulting primary sealing by way of the radially displaced covering ring.

Deviating from the embodiment according to FIGS. 1 and 2, the covering ring 6 according to FIGS. 3a and 3b has passage holes or passage bores 12 which are distributed uniformly with respect to one another along the circumference. In view of a predetermined differential pressure, the lateral contact pressure force of the covering ring 6 on the bristle bundle B is to be kept within predetermined limits.

FIGS. 3a and 3b show only schematically an axial position of the engine casing 1 which is the same and unchanged for both cases.

In contrast to FIG. 3a—steady-state operating condition, for example, of a gas turbine engine—FIG. 3b illustrates the sealing compensation of a comparatively pronounced shaft eccentricity Δr in the unsteady operating condition. In the radially exterior circumferential area, the bristles are displaced relative to the eccentricity Δr, the covering ring 6 radially following the shaft displacement. Relative to the radial shaft displacement, the maximal shaft gap y is formed locally on the bottom with respect to the local bristle ends. It is recognized that locally on the bottom the maximal gap width 2 D is clearly, that is, by more than half, smaller than the locally lower maximal shaft gap y with respect to the bristle ends. Therefore, in this case, the covering ring 6 defines predominantly the primary sealing on the engine shaft 2 with a comparatively low sealing leakage.

The maximal inside diameter of the covering ring 6 relative to the surface of the engine shaft 2 therefore defines in the normal or steady-state operating condition (FIGS. 1 and 3a) the radial sealing gap D along the total circumference which, in the case of FIG. 3b, locally radially on top has become zero and locally radially on the bottom is enlarged by twice (2 D) its normal gap width.

The brush seal described above by means of the drawings is also a component of the invention.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Brush seal for turbo-engines for sealing off spaces on a circumferential gap which are acted upon by pressure in a different manner, particularly between an engine casing and an engine shaft, a holding device for a bristle bundle being provided on the engine casing, from which holding device the bristle bundle is guided between circumferential webs in a sealing manner against the engine rotor and forms an axial gap in the circumferential direction with respect to the one web facing the high pressure side, wherein in the axial gap, a covering ring for the bristle bundle is arranged in an axially and radially movable manner, which covering ring is operated by the differential pressure to be displaceable with respect to the bristle bundle, and wherein the covering ring is located between the webs and includes a radial inward portion which projects radially inwardly out of the axial gap with respect to radial inward ends of the webs surrounding the engine shaft at a distance and surrounds the engine shaft by means of a radial sealing gap.

2. Brush seal according to claim 1, wherein the covering ring has axial flow permeable perforations.

3. Brush seal according to claim 2, wherein the perforations are arranged essentially in an area of the axial gap on the covering ring.

4. Brush seal according to claim 3, wherein the covering ring surrounds the engine shaft by means of a radial sealing gap which is dimensioned along its whole circumference such that, in the case of a shaft eccentricity and a resulting bristle displacement on one side as well as in each case a resulting locally maximal shaft gap with respect to the bristle ends on the opposite other side, the covering ring is moved along in the sense of the shaft eccentricity radially in the axial gap and in the process forms mainly the primary shaft seal whose locally maximal radial gap width is constructed to be smaller than the respective local maximal shaft gap with respect to the bristle ends.

5. Brush seal according to claim 2, wherein the covering ring surrounds the engine shaft by means of a radial sealing gap which is dimensioned along its whole circumference such that, in the case of a shaft eccentricity and a resulting bristle displacement on one side as well as in each case a resulting locally maximal shaft gap with respect to the bristle ends on the opposite other side, the covering ring is moved along in the sense of the shaft eccentricity radially in the axial gap and in the process forms mainly the primary shaft seal whose locally maximal radial gap width is constructed to be smaller than the respective local maximal shaft gap with respect to the bristle ends.

6. Brush seal according to claim 1, wherein the covering ring has axial passage holes.

7. Brush seal according to claim 6, wherein the axial passage holes are arranged essentially in an area of the axial gap on the covering ring.

8. Brush seal according to claim 7, wherein the covering ring surrounds the engine shaft by means of a radial sealing gap which is dimensioned along its whole circumference such that, in the case of a shaft eccentricity and a resulting bristle displacement on one side as well as in each case a resulting locally maximal shaft gap with respect to the bristle ends on the opposite other side, the covering ring is moved along in the sense of the shaft eccentricity radially in the axial gap and in the process forms mainly the primary shaft seal whose locally maximal radial gap width is constructed to be smaller than the respective local maximal shaft gap with respect to the bristle ends.

9. Brush seal according to claim 6, wherein the covering ring surrounds the engine shaft by means of a radial sealing gap which is dimensioned along its whole circumference such that, in the case of a shaft eccentricity and a resulting bristle displacement on one side as well as in each case a resulting locally maximal shaft gap with respect to the bristle ends on the opposite other side, the covering ring is moved along in the sense of the shaft eccentricity radially in the axial gap and in the process forms mainly the primary shaft seal whose locally maximal radial gap width is constructed to be smaller than the respective local maximal shaft gap with respect to the bristle ends.

10. Brush seal according to claim 1, wherein the covering ring surrounds the engine shaft by means of a radial sealing gap which is dimensioned along its whole circumference such that, in the case of a shaft eccentricity and a resulting bristle displacement on one side as well as in each case a resulting locally maximal shaft gap with respect to the bristle ends on the opposite other side, the covering ring is moved along in the sense of the shaft eccentricity radially in the axial gap and in the process forms mainly the primary shaft seal whose locally maximal radial gap width is constructed to be smaller than the respective local maximal shaft gap with respect to the bristle ends.

11. Brush seal according to claim 1, wherein upstream and downstream circumferential webs are provided which guide the bundle with a circumferentially extending axial gap between the bundle and the upstream web during operation of the turbo engine with a rotating engine rotor, wherein said covering ring is disposed in the axial gap and is displaceable with respect to the bristle bundle in response to differential pressure between the upstream and downstream spaces, and wherein the covering ring projects radially at the axial gap with respect to ends of the webs to form a radial sealing gap which is narrower than a tap between ends of said webs and a facing rotor.

12. Brush seal assembly for a turbo engine of the type having an engine rotor and an engine stator, comprising:

a bristle bundle, a bundle holder holding the bundle in a sealing position with respect to a gap between the engine rotor and engine stator intermediate an upstream high pressure space and a downstream low pressure space, and an axially and radially movable covering ring disposed at the upstream side of the bristle bundle, wherein upstream and downstream circumferential webs are provided on the bundle holder which guide the bundle with a circumferentially extending axial gap between the bundle and the upstream web during operation of the turbo engine with a rotating engine rotor, wherein said covering ring is disposed in the axial gap and is displaceable with respect to the bristle bundle in response to differential pressure between the upstream and downstream spaces, wherein the covering ring projects radially at the axial gap with respect to ends of the webs to form a radial sealing gap which is narrower than a tap between ends of said webs and a facing rotor, and wherein the covering ring is located between the webs and includes a radial inward portion which projects radially inwardly out of the axial gap with respect to radial inward ends of the webs surrounding the engine shaft at a distance and surrounds the engine shaft by means of a radial sealing gap.

13. Brush seal assembly according to claim 12, wherein the covering ring has axial flow permeable perforations.

14. Brush seal assembly according to claim 13, wherein the perforations are arranged essentially in an area of the axial gap on the covering ring.

15. Brush seal assembly according to claim 12, wherein the covering ring has axial passage holes.

16. Brush seal assembly according to claim 15, wherein the axial passage holes are arranged essentially in an area of the axial gap on the covering ring.

17. Brush seal assembly according to claim 12, wherein the covering ring surrounds the engine shaft by means of a radial sealing gap which is dimensioned along its whole circumference such that, in the case of a shaft eccentricity and a resulting bristle displacement on one side as well as in each case a resulting locally maximal shaft gap with respect to the bristle ends on the opposite other side, the covering ring is moved along in the sense of the shaft eccentricity radially in the axial gap and in the process forms mainly the primary shaft seal whose locally maximal radial gap width is constructed to be smaller than the respective local maximal shaft gap with respect to the bristle ends.

18. A turbo engine assembly including an engine rotor, an engine stator surrounding the engine rotor, and a brush seal assembly interposed between the rotor and stator, said brush seal assembly comprising:

a bristle bundle, a bundle holder holding the bundle in a sealing position with respect to a gap between the engine rotor and engine stator intermediate an upstream high pressure space and a downstream low pressure space, and an axially and radially movable covering ring disposed at the upstream side of the bristle bundle, wherein upstream and downstream circumferential webs are provided on the bundle holder which guide the bundle with a circumferentially extending axial gap between the bundle and the upstream web during operation of the turbo engine with a rotating engine rotor, wherein said covering ring is disposed in the axial gap and is displaceable with respect to the bristle bundle in response to differential pressure between the upstream and downstream spaces, wherein the covering ring projects radially at the axial gap with respect to ends of the webs to form a radial sealing gap which is narrower than a tap between ends of said webs and a facing rotor, and wherein the covering ring is located between the webs and includes a radial inward portion which projects radially inwardly out of the axial gap with respect to radial inward ends of the webs surrounding the engine shaft at a distance and surrounds the engine shaft by means of a radial sealing gap.

19. A turbo engine assembly according to claim 18, wherein the covering ring has axial flow permeable perforations.

20. A turbo engine assembly according to claim 18, wherein the covering ring has axial passage holes.

* * * * *